United States Patent
Taenzer et al.

(10) Patent No.: US 6,438,245 B1
(45) Date of Patent: Aug. 20, 2002

(54) HEARING AID COMMUNICATIONS EARPIECE

(75) Inventors: Jon C. Taenzer, Los Altos; William D. Mercer, South San Francisco, both of CA (US)

(73) Assignee: ReSound Corporation, Redwood City, CA (US)

(*) Notice: Subject to any disclaimer, the term of this patent is extended or adjusted under 35 U.S.C. 154(b) by 0 days.

(21) Appl. No.: 09/184,071

(22) Filed: Nov. 2, 1998

(51) Int. Cl.[7] ................................................ H04R 25/00
(52) U.S. Cl. ...................... 381/330; 381/328; 381/322
(58) Field of Search .......................... 381/84, 127, 382, 381/370, 330, 328, 322; 379/428.02, 430, 52

(56) References Cited

U.S. PATENT DOCUMENTS

| | | |
|---|---|---|
| 5,721,783 A | 2/1998 | Anderson |
| 5,761,319 A | 6/1998 | Dar et al. |
| 5,796,821 A | 8/1998 | Crouch et al. |
| 6,160,895 A | * 12/2000 | Dupont ........................ 381/330 |

* cited by examiner

*Primary Examiner*—Sinh Tran
*Assistant Examiner*—Lonnie L Ray
(74) *Attorney, Agent, or Firm*—Bingham McCutchen LLP; David G. Beck

(57) ABSTRACT

A mechanism for detachably mounting an earpiece having a receiver and an acoustic tube to any one of a variety of hearing aids includes using an adhesive and a clip attached to the acoustic tube to adhere the clip and thus the earpiece to a surface of the hearing aid, so that an open end of the acoustic tube is near an acoustic aperture of the hearing aid and can thus provide an acoustic sound signal to a microphone within the hearing aid. Alternatively, the clip can be provided with a magnet and a ferric plate can be fixed to a surface of the hearing aid, so that magnetic forces between the magnet and the ferric plate will attach the earpiece and the hearing aid together. The magnet and the ferric plate can be chosen so that the earpiece will separate from the hearing aid when a relative force between the earpiece and the hearing aid exceeds a predetermined threshold, thus preventing injury to a user wearing the hearing aid and the earpiece.

15 Claims, 3 Drawing Sheets

HEARING AID COMMUNICATIONS EARPIECE

BACKGROUND OF THE INVENTION

1. Field of the Invention

The present invention relates generally to a two-way communications earpiece for use with a hearing aid.

2. State of the Art

Conventional two-way communications gear such as headsets and telephone handsets can present difficulties when used with hearing aids. In particular, the portion of the headset or telephone handset that rests against a user's ear can create a closed volume that reflects any sound leaking out of the user's ear from the hearing aid, back to the hearing aid microphone. An unpleasant positive feedback situation quickly develops which degrades the effectiveness of the hearing aid and can make conversation impossible.

Furthermore, cell phones can generate amplitude-modulated signals that interfere with hearing aids. For example, cell phones that employ the GSM standard commonly used in Europe, communicate with base stations at radio frequencies using digital signals. The communications are typically performed using time-division-multiple access (TDMA) protocols, so that the cell phone periodically transmits data in digital form over a radio frequency (RF) carrier wave. Between time slots, the carrier wave is turned off. The repetition frequency of the time slots can be on the order of about 220 Hz. In other words, even though the carrier wave is at a radio frequency and carries digital information, it is turned on and off at about 220 Hz and thus constitutes an amplitude modulated signal having a fundamental frequency of about 220 Hz. The radio frequency of the cell phone carrier wave is typically high enough that electrical components and lines within the hearing aid act as antennae and receive the carrier wave when the cell phone is close to the hearing aid, for example pressed against the user's ear. Circuit components within the hearing aid rectify the carrier wave and unintentionally recover the modulation. Although the electrical noise generated in the hearing aid by this unintended reception is small in magnitude, it can occur in the early, pre-gain stages of the hearing aid and thus be substantially amplified by the time it passes through the gain stages and appears at the output, for example a speaker, of the hearing aid. In this way a cell phone can introduce noise having a fundamental frequency of about 220 Hz into the hearing aid, and that frequency plus its harmonics are well within the frequency range of the human ear, which can significantly interfere with the user's ability to understand speech or other sounds relayed by the hearing aid.

In addition to the RF pulses radiated by the GSM cell phones and other cell phones using similar RF methods, the act of turning the RF transmitter on and off causes the current drawn by the cell phone circuitry to pulse up and down at the same rate that the transmitter is turned on and off. This generates magnetic pulses. If a cell phone of this type is held to the ear of a user wearing a hearing aid equipped with a pickup telecoil, then the telecoil will detect the magnetic pulses. The resulting signal from the telecoil pickup is large enough that it can render the hearing aid unusable in this mode, even if the hearing aid is shielded against the RF pulses.

U.S. Pat. No. 5,796,821 to Crouch, et al. (Crouch) discloses a hearing aid telephone interconnect system (HATIS) that provides an output audio electronic signal originally intended for a speaker in a telephone handset, stereo sound system, television set, etc. to a coil in a "T-coupler" device located near a user's pickup telecoil-equipped hearing aid. The T-coupler includes a coil. Based on the electronic signals, the coil generates electromagnetic waves in the audio frequency spectrum. The pickup telecoil in the hearing aid receives the electromagnetic signal generated by the coil, and the hearing aid uses the received signal to provide a corresponding acoustic signal to the user.

U.S. Pat. No. 5,761,319 to Dar, et al. (Dar) discloses an instrument for augmenting the versatility of an in-the-ear (ITE) hearing aid or a completely-in-the-canal (CIC) hearing aid. In particular, Dar discloses an instrument mounted behind the ear and including a receiver for receiving wireless signals, an electroacoustic transducer for generating acoustic sound signals corresponding to the wireless signals, and a tube that is positioned near the hearing aid to convey the acoustic sound signals to a microphone or acoustic pick up port of the in-the-ear hearing aid.

SUMMARY OF THE INVENTION

The present invention accurately and efficiently relays incoming signals to a hearing aid from a two-way communications device, such as a cell phone, without inducing electronic interference or acoustic feedback. An exemplary embodiment of the invention includes an earpiece having a breakaway mount for attaching the earpiece directly to a hearing aid worn by a user, and an acoustic tube that conveys sound from a speaker in the earpiece to an acoustic aperture in an outer housing of the hearing aid. The breakaway mount can accurately position the acoustic tube near an acoustic pickup of the hearing aid, such as an acoustic aperture that directs acoustic sound to a microphone within the hearing aid, so that the acoustic tube can efficiently provide acoustic sound signals to the hearing aid. The earpiece can also include a microphone for picking up the user's voice and surrounding sounds, and relaying corresponding signals back to the two-way communications device.

The breakaway mount allows the earpiece to be mounted on a variety of hearing aids including in-the-ear (ITE), in-the-canal (ITC), and behind-the-ear (BTE) hearing aids. The earpiece can break away from the hearing aid when force is applied to the earpiece, so that force will not be transferred to the hearing aid and potentially injure the user. The earpiece can also be quickly and easily mounted on, or dismounted from, the hearing aid by the hearing aid wearer depending on the wearer's particular needs at any given time. For example, the hearing aid wearer can easily mount the earpiece on, or easily dismount the earpiece from, the hearing aid while wearing the hearing aid.

Some hearing aids are provided with a pickup telecoil, which can receive sound in the form of electromagnetic waves in the audio frequency spectrum. To take advantage of this feature, an exemplary embodiment of the earpiece is provided with a transmitter telecoil that is connected to a transceiver within the earpiece. The earpiece transceiver can then drive the transmitter telecoil to generate electromagnetic waves in the audio frequency spectrum, which are received by the pickup telecoil in the hearing aid. Thus, the earpiece can provide an electronic sound signal directly to the hearing aid via an electromagnetic link between the transmitter telecoil in the earpiece and the pickup telecoil in the hearing aid. The electronic sound signal provided by the transmitter coil can either accompany or replace the acoustic sound signal conveyed by the acoustic tube to the hearing aid. When both are provided, the hearing aid user can control whichever signal is desired using the standard microphone/ telecoil switching function provided in telecoil equipped hearing aids. Unlike the HATIS device, the earpiece also includes an acoustic microphone that picks up sounds ambient to the earpiece, such as the user's voice, and can provide the microphone output signal to the transceiver so that the sounds picked up by the microphone can be transmitted or conveyed to a remote device. The remote device can be the same device from which the transceiver is receiving signals for transfer to the hearing aid via the transmitter telecoil in the earpiece and the pickup telecoil in the hearing aid. The remote device can be, for example, a cell phone.

Generally speaking, exemplary embodiments of the invention relate to a two-way communications earpiece for use with a hearing aid, including a microphone for picking up sounds ambient to the earpiece, an acoustic tube for providing acoustic sound to a microphone in the hearing aid, and a mount for detachably mounting and orienting the earpiece on the hearing aid so that when the earpiece is mounted on the hearing aid, an end of the acoustic tube is near the hearing aid microphone and the acoustic tube can convey acoustic sound generated by the transducer in the earpiece to at least one of an acoustic aperture and a microphone in the hearing aid, while leaving the hearing aid microphone unobstructed to ambient sounds.

BRIEF DESCRIPTION OF THE DRAWINGS

Other objects and advantages of the present invention will become apparent to those skilled in the art from the following detailed description of preferred embodiments, when read in conjunction with the accompanying drawings. Like elements have been designated with like reference numerals.

DETAILED DESCRIPTION OF THE PREFERRED EMBODIMENTS

Figure 1A:
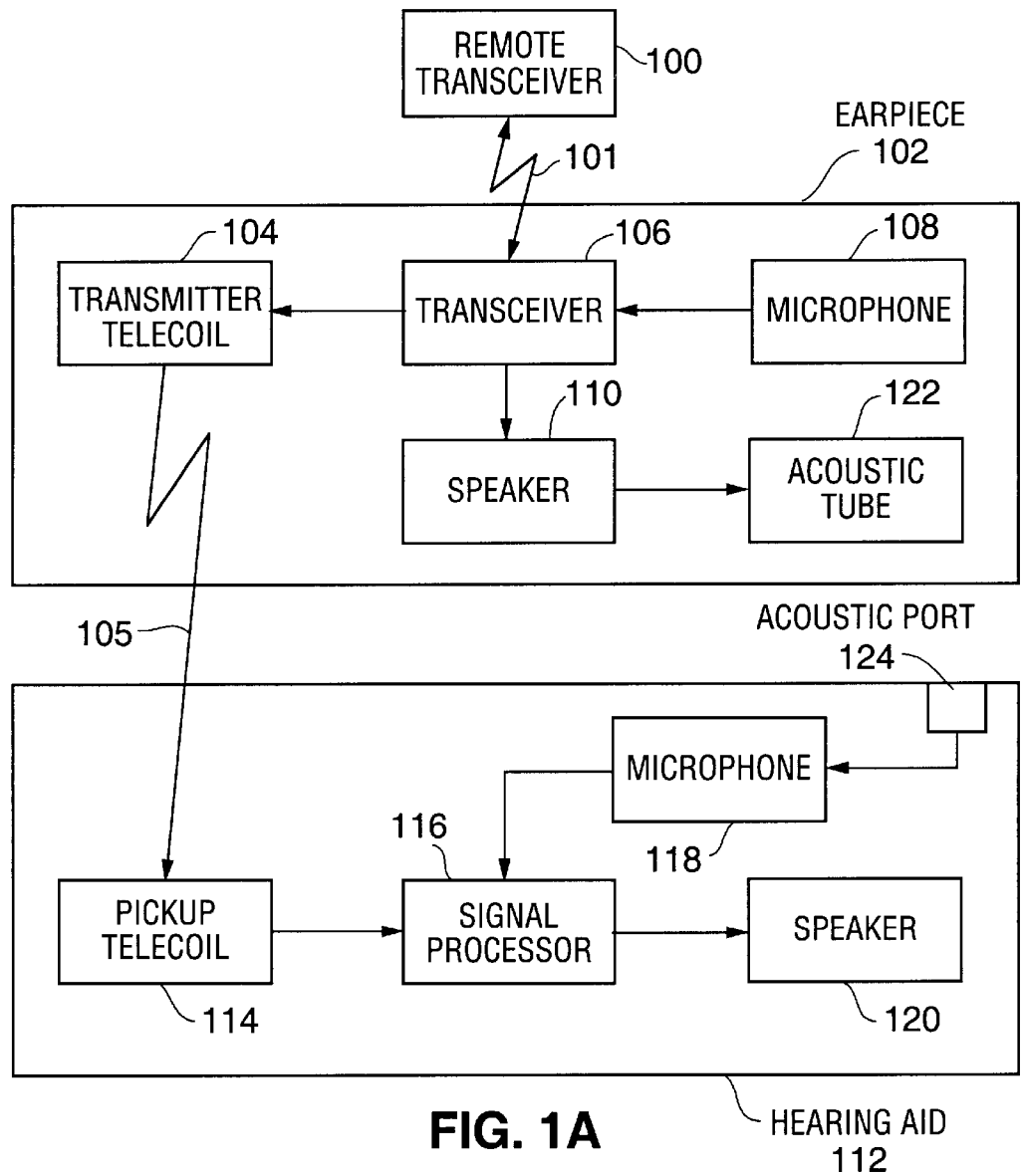
FIG. 1A is a block diagram of an exemplary embodiment of the invention.

FIG. 1A is a block diagram in accordance with an embodiment of the invention.

In particular, FIG. 1A shows an earpiece 102 connected via a wireless link 101 to a remote transceiver 100. The remote transceiver can be, for example, a cell phone, a two-way radio, a radio transmitter, or other communications device. The earpiece 102 includes an acoustic tube 122 which attaches to the hearing aid 112 and conveys acoustic sound signals to the microphone 118 of the hearing aid 112.

The earpiece 102 can also include a two-way radio transceiver, a microphone for picking up speech of a user wearing the earpiece, and a speaker or other transducer for producing sound in response to an electronic signal from the receiver.

In particular, the earpiece 102 includes a two-way radio transceiver 106 that can both send electromagnetic signals to, and receive electromagnetic signals from, the remote transceiver 100. Those skilled in the art will understand that the transceiver 106 can be a transponder, and the transceiver 100 can be an interrogator associated with the transponder, or vice versa. An exemplary transponder that can be used with various embodiments of the invention is described in U.S. Pat. No. 5,721,783 to Anderson, which is hereby incorporated by reference.

The transceiver 106 can also receive signals from the microphone 108, and relay the signals from the microphone 108 to the remote transceiver 100. To convey sound signals to the user, the transceiver 106 can drive a speaker 110 to generate an acoustic sound signal in accordance with the signal received from the remote transceiver 100. The acoustic sound signal from the speaker 110 is provided to one end of the acoustic tube 122, and the other end of the acoustic tube 122 emits the acoustic sound signal. The emitter end of the acoustic tube 122 can be mounted on the hearing aid 112 so that it is located near an acoustic aperture 124 of the hearing aid 112, to provide the acoustic sound signal to the microphone 118 of the hearing aid 112 via the acoustic aperture 124.

The earpiece 102 can also be provided with a transmitter telecoil 104. When the hearing aid 112 is also provided with a pickup telecoil 114, the transmitter telecoil 104 can be used to transmit an electromagnetic audio frequency signal to the pickup telecoil 114 via an electromagnetic link 105. The hearing aid 112, which represents an exemplary hearing aid that is commercially available, also includes a signal processor 116 for receiving signals from the pickup telecoil 114 and/or the microphone 118. The signal processor then provides an output signal to the speaker 120 to relay sound to the user.

The sound picked up by the microphone 108 in the earpiece, for example the user's own voice, can be fed back to the hearing aid 112 via the remote transceiver 100. At the same time, the microphone 118 in the hearing aid 112 can also pick up the user's voice and other ambient sounds.

Figure 1B:
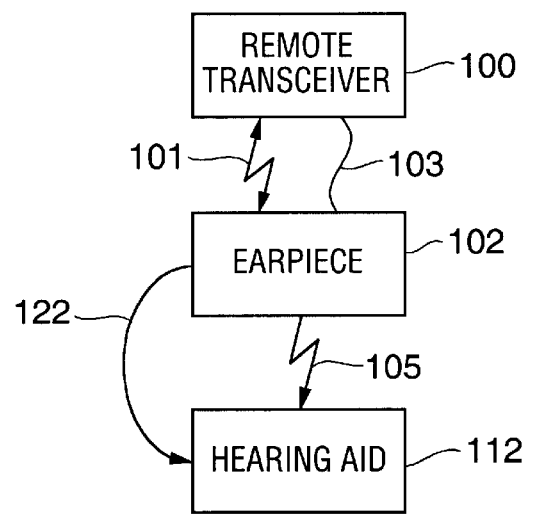
FIG. 1B is a block diagram of another exemplary embodiment of the invention.

As shown in FIG. 1B, a wire connection 103 can be used instead of the wireless connection 101 to link the remote transceiver 100 with the earpiece 102. FIG. 1B also explicitly shows that the acoustic tube 122 can be used, for example, in addition to or instead of the electromagnetic link 105, to convey acoustic sound signals from the earpiece 102 to the hearing aid 112.

The transceiver 106 in the earpiece 102 can be configured to communicate with the remote transceiver 100 when the remote transceiver 100 is connected to the earpiece 102 via the wired link 103 or the wireless link 101. The remote transceiver 100 can be located at a distance from the hearing aid 112, to allow any audio frequency electromagnetic noise generated by the remote transceiver 100, such as noise caused by switching a cell phone carrier wave, to attenuate sufficiently before reaching the hearing aid 112. Thus, when for example the remote transceiver 100 is clipped to the user's belt, the portion of electromagnetic noise generated by the remote transceiver 100 that reaches the hearing aid 112 at the user's ear is small enough that any adverse effect it has on the hearing aid 112 is negligible.

Figure 2:
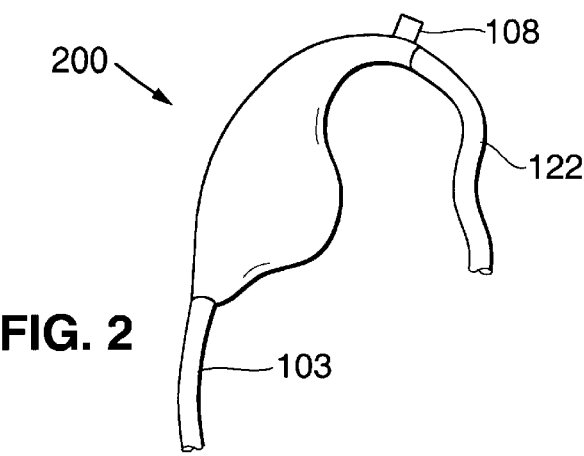
FIG. 2 shows an exemplary embodiment of the invention.

FIG. 2 shows an external view of an earpiece 200 that includes the elements of the earpiece 102 shown in FIG. 1A. In particular, FIG. 2 shows the microphone 108 mounted on one end of the earpiece 200 with the acoustic tube 122 mounted near the microphone 108, and the wired link 103 attached to the other end. The earpiece 200 can be very thin, so that it will fit next to a BTE hearing aid. The acoustic tube 122 can be fixed in the body of the earpiece 200. The acoustic tube 122 can also be initially provided with an excess length, for example three inches, which can then be trimmed to an appropriate length for a particular user. In accordance with an embodiment of the invention, the attachment between the tube 122 and the earpiece 200 is stronger than the attachment between the tube 122 and the hearing aid, so that the tube 122 will release from the hearing aid before releasing from the earpiece 200 in a breakaway situation.

Figure 3A:
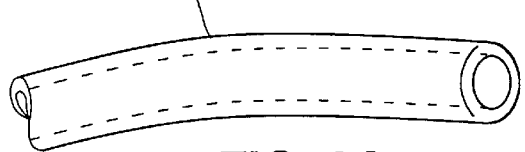
FIGS. 3A–3C show components of an exemplary embodiment of the invention separately and in combination.
Figure 3C:
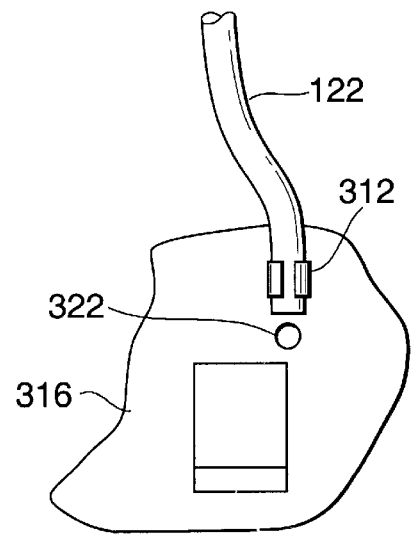
Figure 3B:
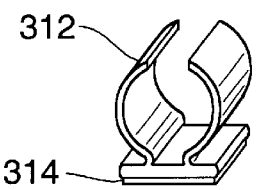

FIG. 3A is a detailed view of the free end of the acoustic tube 122, and FIG. 3B shows a clip 312 having an adhesive layer 314. The adhesive layer 314 can be a piece of double sided tape, or can be any other adhesive that has good bonding characteristics with the clip 312 and an outer surface of the hearing aid 316. As shown in FIG. 3C, the clip 312 can be adhered to an outer surface of a hearing aid 316 so that when the tube 122 is inserted into the clip 312, an end of the tube 122 is near a microphone aperture 322 in the hearing aid 316. The clip 312 can be designed to release the tube 122 if excess force is applied to the earpiece 200. Alternatively, the adhesive layer 314 can be selected so that the adhesive bond will release if shear and/or tensile forces on the adhesive bond exceed predetermined limits. Those of ordinary skill in the art will recognize that the predetermined limits can be chosen in accordance with principles well known in the art to prevent injury to the user. The clip 312 can also be designed so that the user can easily insert the tube 122 into the clip 312 on the hearing aid 316 by feel, while wearing the hearing aid 316.

Figure 4A:
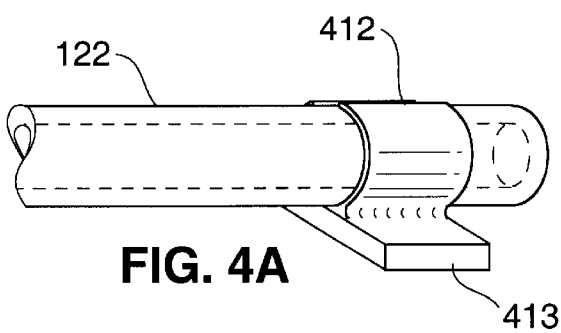
FIGS. 4A–4D show components of another exemplary embodiment of the invention separately and in combination.
Figure 4C:
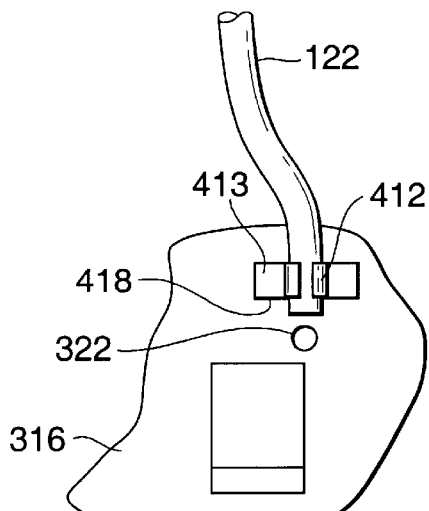
Figure 4B:
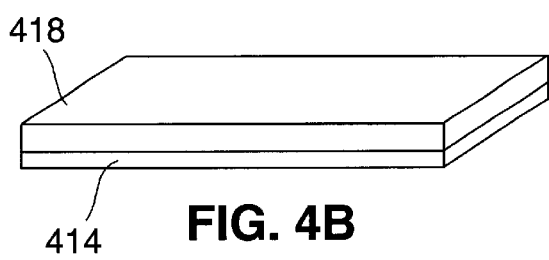

FIGS. 4A–D show an alternate method for attaching the acoustic tube 122 to the hearing aid 316. As shown in FIG. 4A, the acoustic tube 122 can be inserted into a clip 412 having a magnet 413, or the magnet 413 can be permanently attached to the tube 122. As shown in FIG. 4B, a ferric plate 418 is provided on one side with an adhesive layer 414 such as double sided tape. As shown in FIG. 4C, the ferric plate 418 is adhered to an outer surface of the hearing aid 316 near the microphone aperture 322, and the magnet 413 holds the clip 412 and the tube 122 against the ferric plate 418 so that sound emitted from the end of the tube 122 can enter the microphone aperture 322. Using the magnet 413 allows the acoustic tube 122 (and the earpiece connected to it) to be attached and detached an indefinite number of times without degrading the strength or performance characteristics of the attachment. Using the magnet 413 also has an advantage in that the user can easily attach the earpiece to the hearing aid, since the magnetic attraction between the ferric plate 418 and the magnet 413 will help the user guide the tube 122 into position. The ferric plate 418 and the magnet 413 can be chosen so that the magnetic bond will release if shear and/or tensile forces on the magnetic bond exceed predetermined limits. Those of ordinary skill in the art will recognize that the predetermined limits can be chosen in accordance with principles well known in the art to prevent injury to the user. Alternatively, the clip 412 can be designed to release the tube 122 if excess force is applied to the earpiece 200.

Figure 4D:
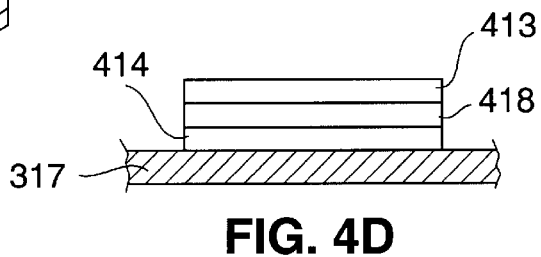

FIG. 4D shows a side view of the mounting configuration shown in FIG. 4C, with the adhesive layer 414 sandwiched directly between an outer surface 317 of the hearing aid 316 and the ferric plate 418, with the magnet 413 on the opposite side of the ferric plate 418 from the adhesive layer 414. Alternatively, a ferric plate can be molded directly into an outer surface of the hearing aid 316, or otherwise permanently attached to the hearing aid 316.

Figure 5A:
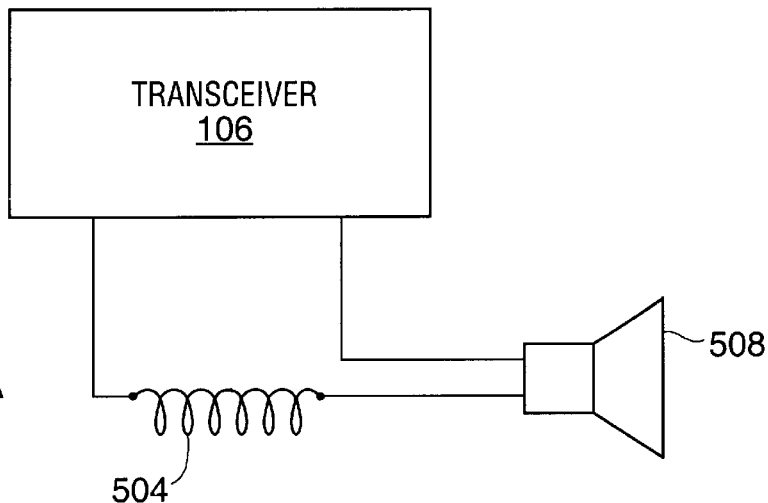
FIGS. 5A–5C show different exemplary embodiments of the invention including a transmitter telecoil.
Figure 5B:
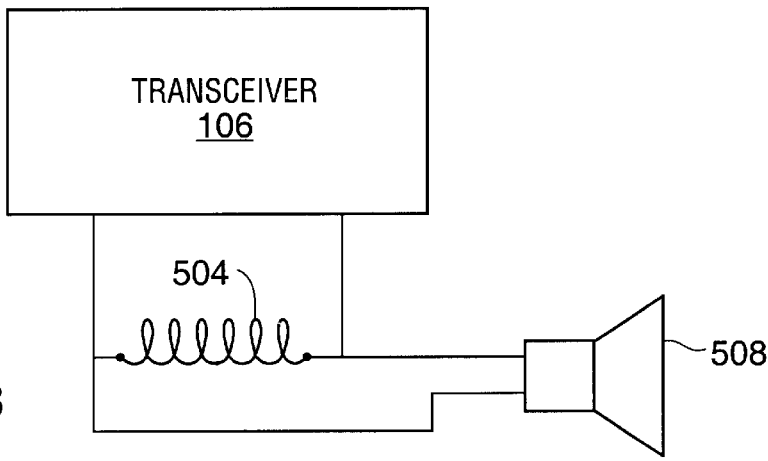
Figure 5C:
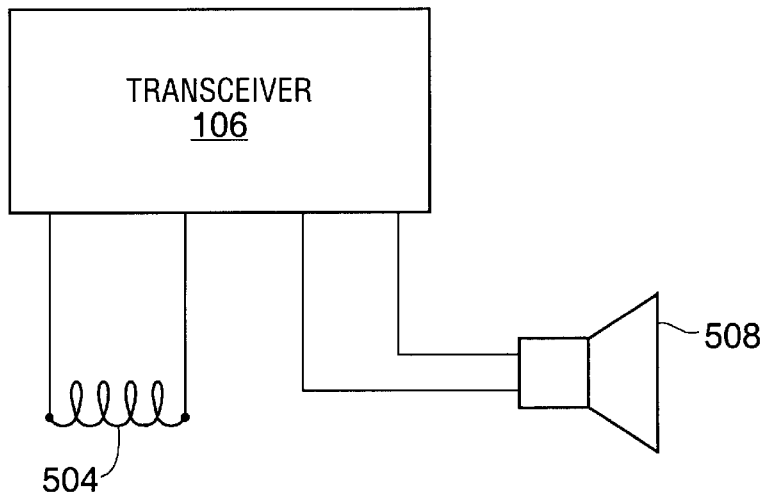

In addition to advantageously breaking away to prevent injury to the user when excess force is applied to the earpiece, the earpiece attachment structures described above and shown in FIGS. 3A–3C and 4A–4D can be used to mount the earpiece on virtually any hearing aid.

Where an embodiment of the invention includes a transmitter telecoil in the earpiece, the transmitter telecoil can be separate and distinct from the earpiece speaker coil. Alternatively, the earpiece speaker coil can be configured to function as both the speaker driver and the transmitter telecoil. The different configurations of a) a separate transmitter telecoil and b) a dual purpose coil in the earpiece speaker, each have different advantages. For example, in an earpiece having a separate transmitter telecoil, the transmitter telecoil and the earpiece speaker coil can each be positioned and oriented to independently optimize their respective functions. On the other hand, an earpiece configured with a dual purpose earpiece speaker coil has fewer components than an earpiece having a separate transmitter telecoil, and can therefore be less expensive to manufacture, more compact and lighter in weight.

Where the earpiece transmitter telecoil is separate and distinct from the earpiece speaker coil, different electrical connections are possible. For example, FIG. 5A shows an embodiment wherein a transmitter telecoil 504 is connected in series with a speaker coil 508 across the transceiver 106. FIG. 5B shows the telecoil 504 connected in parallel with the speaker coil 508 across the transceiver 106, and FIG. 5C shows the telecoil 504 and the speaker coil 508 each having separate and independent electrical connections with the transceiver 106.

Those skilled in the art will appreciate that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A two-way communications earpiece for use with a hearing aid, comprising:
   an acoustic tube; and
   a mount for detachably mounting the earpiece on a hearing aid so that when the earpiece is mounted on the hearing aid, an end of the acoustic tube is fixed near a microphone in the hearing aid and the acoustic tube can convey acoustic sound generated by a transducer in the earpiece to at least one of an acoustic aperture and the microphone in the hearing aid.

2. The apparatus of claim 1, wherein the mount fixes the earpiece to the hearing aid by adhering to a surface of the hearing aid via an adhesive.

3. The apparatus of claim 2, wherein the mount separates from the hearing aid when a relative force between the earpiece and the hearing aid exceeds a predetermined threshold.

4. The apparatus of claim 2, wherein the adhesive is double-sided tape.

5. The apparatus of claim 1, wherein the mount includes a magnet fixed to one of the earpiece and an outer surface of the hearing aid, and a ferric plate fixed to the other of the earpiece and the outer surface of the hearing aid, and magnetic force between the magnet and the ferric plate fixes the earpiece to the hearing aid.

6. The apparatus of claim 5, wherein the ferric plate separates from the magnet when a relative force between the earpiece and the hearing aid exceeds a predetermined threshold.

7. The apparatus of claim 5, wherein the one of the ferric plate and the magnet that is fixed to the outer surface of the hearing aid is adhered to the outer surface of the hearing aid via an adhesive.

8. The apparatus of claim 1, wherein the earpiece includes a transmitter telecoil for transmitting audio frequency electromagnetic waves to a corresponding pickup telecoil in a hearing aid.

9. The apparatus of claim 8, wherein the transmitter telecoil and the transducer are connected in series.

10. The apparatus of claim 8, wherein the transmitter telecoil and the transducer are connected in parallel.

11. The apparatus of claim 1, wherein the transducer functions as a transmitter telecoil for transmitting audio frequency electromagnetic waves to a corresponding pickup telecoil in a hearing aid.

12. The apparatus of claim 1, wherein the detachable mount is fixed to the earpiece via the acoustic tube, and releases the acoustic tube when a relative force between the earpiece and the hearing aid exceeds a predetermined threshold.

13. The apparatus of claim 1, further comprising:
one of a two-way transceiver and a transponder; and
a microphone.

14. A two-way communications earpiece for use with a hearing aid, comprising:
an acoustic tube; and
means for detachably mounting the earpiece on a hearing aid so that when the earpiece is mounted on the hearing aid, an end of the acoustic tube is near a microphone in the hearing aid and the acoustic tube can convey acoustic sound generated by a transducer in the earpiece to at least one of an acoustic aperture and the microphone in the hearing aid.

15. The earpiece of claim 14, further comprising:
one of a two-way transceiver and a transponder; and
a microphone.

* * * * *